(12) United States Patent
Herke et al.

(45) Date of Patent: Sep. 21, 2004
(10) Patent No.: US 6,794,604 B2

(54) WEB SECURING SYSTEM FOR LASER PROCESSING

(75) Inventors: Donald Herke, Shoreview, MN (US); John J. Zik, Hudson, WI (US); Dan B. Miller, Richmond, WI (US); William E. Lawson, Somerset, WI (US)

(73) Assignee: Preco Laser Systems, LLC, Somerset, WI (US)

( * ) Notice: Subject to any disclaimer, the term of this patent is extended or adjusted under 35 U.S.C. 154(b) by 0 days.

(21) Appl. No.: 10/368,867

(22) Filed: Feb. 19, 2003

(65) Prior Publication Data
US 2004/0159637 A1 Aug. 19, 2004

(51) Int. Cl.[7] .............................................. B23K 26/38
(52) U.S. Cl. ............................. 219/121.67; 219/121.72
(58) Field of Search ........................ 219/121.6, 121.67, 219/121.68, 121.69, 121.7, 121.71, 121.72, 121.82, 121.84, 121.85, 121.18, 121.19, 121.2

(56) References Cited

U.S. PATENT DOCUMENTS

| | | | |
|---|---|---|---|
| 4,639,572 A | 1/1987 | Gruzman et al. ........... 219/121 |
| 5,146,821 A | 9/1992 | Bruder et al. ................... 83/40 |
| 5,234,465 A | 8/1993 | Hahnke et al. ............. 264/138 |
| 5,245,897 A | 9/1993 | Arnold et al. ................. 83/56 |
| 5,681,412 A | 10/1997 | Nedblake et al. ........... 156/184 |
| 5,909,237 A * | 6/1999 | Kerr et al. ................... 347/262 |
| 6,414,264 B1 | 7/2002 | von Falkenhausen .. 219/121.72 |
| 6,450,383 B2 | 9/2002 | Crowley et al. .............. 226/31 |
| 6,454,197 B1 | 9/2002 | Everett .................... 242/334.4 |
| 6,628,423 B1 * | 9/2003 | Sasaki ........................ 358/1.7 |

* cited by examiner

*Primary Examiner*—Samuel M. Heinrich
(74) *Attorney, Agent, or Firm*—Westman, Champlin & Kelly, P.A.

(57) ABSTRACT

The system for laser processing webs includes a laser system having a beam source, a controller and one or more heads to direct a laser beam onto a web. A cylinder cable of controlled rotation applies a web-securing force to the web under the laser beam to secure the web so that the web does not flutter or shift during laser processing. A template may be placed over the cylinder to apply the web-securing force in specific patterns or areas as needed.

46 Claims, 8 Drawing Sheets

WEB SECURING SYSTEM FOR LASER PROCESSING

CROSS-REFERENCE TO RELATED APPLICATION(S)

None.

BACKGROUND OF THE INVENTION

The present application relates to an apparatus for securing and advancing a web material for laser processing. More particularly, the present invention relates to a technique for using a web-securing drum to secure and advance the material under a lager or high energy beam for processing.

Generally, laser or e-beam processing of a moving web involves directing a focused beam onto the surface of the web material as the web material is advanced. As the beam touches the surface of the moving web, the beam vaporizes and/or melts the web material. Traditionally, laser processing systems have used vacuums located beneath the cutting surface for drawing away smoke and debris from the cutting areas. Additionally, laser processing systems have used vacuums for work piece retention on flat surfaces. Such vacuums are known in the art.

Laser processing of a moving web or a continuous substrate requires consideration of a number of factors. For example, flapping and fluttering of the web, shifting of the web material transverse to the direction of movement, wrinkling and creasing of the web material, varying tensions across the web, varying thickness of the web, and varying web composition contribute to inaccuracy and inefficiency in the process.

Typically, laser processing requires the minimization of flapping and shifting of the web material, while advancing the web under the laser beam. Rollers positioned on opposite sides of the laser hold the web material in tension and advance the web material through the cutting zone underneath the laser beam. However, tensioning the web material lacks precision, because the chemical structure of the web material can vary across the sheet, affecting the elasticity of the sheet material. In other words, the rollers may hold some areas in tension while other areas of the web material can flap and flutter as the web is advanced by the rollers particularly at high speeds.

Additionally, web materials may not be uniform in thickness, width, length or composition. For example, a web material that is rolled may be longer along the edges than in the middle. The thickness of the web may vary. The edges of the web may be wavy or uneven. Finally the web material for example may be non-homogenous, such that the thermal coefficients of the substrate can vary across the substrate, or woven, such that internal stresses can vary across the substrate. These inconsistencies can lead to undesirable wrinkling, creasing or tearing of the web material. Additionally, such variations can cause the beam to move in and out of focus, can contribute to inaccuracies and inefficiencies (such as higher power usage), can contribute to inconsistencies in the score or cut pattern depth, and can cause the size of the focal point to vary at the surface of the web.

One solution for limiting such web movement involves increasing the tension. However, with some web materials (particularly very thin materials) and with some laser processes (such as cross-cutting, shape cut-outs, and the like) increasing the tension on the web material is not an option. Specifically, increasing the tension on a very thin material may cause the web to break. Increasing the tension on thicker materials where the laser process involves a cross-cut (a cut that is transverse to the direction of the moving web) or a shape cut-out with a substantial area can cause the web material to tear. In such instances, the laser process may sufficiently weaken the web material that the tension rollers cannot be used. Moreover, tensioning does not resolve issues relating to web thickness variations, compositional variations, or dimensional variations, and may exacerbate creasing and wrinkling of the substrate.

In some instances, the web material is manufactured in such a way that it has internal stresses. Woven fabrics and certain non-homogenous materials may have such internal stresses. These stresses can impact the accuracy of the laser process because the internal stresses are relieved to some degree by the laser processing, which may cause the web material to shift or move. With web materials that have varying internal stresses, tension alone may be insufficient to prevent the web material from shifting before or during the laser processing operation. For example, when cutting strips from a moving web of material that contains such internal forces, the laser cutting process releases the internal stresses of the material. As the web material is cut into strips, the downstream strip (the strip after laser cutting) becomes difficult to control. Moreover, as the positioning of the web material entering the "cutting zone" is partly dependent on the downstream components in a conventional "tensioning" system, the material may shift before, during, and after laser processing such that the score line or cut line can vary across the sheet material.

In general, in laser processing, precision laser processing requires precise location and positioning of the laser spot as well as accurate power modulation. When the web material shifts or flaps, the precision of the laser spot placement and the modulation of the power are affected. Specifically, shifting or inaccuracy in the cut or placement of the spot affects the power level at which the laser must be run in order to perform the laser process. When the web material flaps a great deal, the laser has to be run at a higher power level in order to be cut because the position of the laser spot cannot be controlled to maintain peak efficiency. As a result, sometimes the laser processing must be slowed down in order to minimize the flap and flutter of the web material.

Cut out shapes or patterns on a moving web present additional difficulties. If the cut out areas constitute a significant surface area of the web material, tensioning of the web material during the cut out process can cause the web material to either pull apart or shrink up so that it cannot be rewound on a roller on the other end. Moreover, flapping of the web material during the cut out process may cause the objects to fall out of the moving web into the cutting zone vacuum.

With certain film materials, which are simply too thin or too elastic to tension across the rollers, prior art systems sometimes used a conveyor to secure and advance the film material under the laser beam. However, even with guide edges to hold the material on the moving conveyor, the material can shift during laser processing on the conveyor such that the accuracy of the laser process is compromised by the movement of the material in a direction that is often transverse to the movement of the conveyor.

Finally, with respect to cutting of strips of material, in the prior art, the thickness of the strips was in part determined by a spacing of the laser heads. For example, the focusing lenses and mirrors of the fixed beam laser apparatus, or any other laser beam set up takes a certain amount of space relative to one another. When positioned adjacent to one another, the beams are necessarily spaced from one another. In certain applications, in order to achieve a narrower cutting area, the laser heads are aligned longitudinally in the direction of the cut for a closer lateral arrangement without interfering with each other. However, with respect to previously described materials that contain internal stresses, stacking the lasers in such a manner results in widely varying cuts. Specifically, as the first laser beam initiates its first cut, the materials internal stresses are somewhat relieved and the material downstream will begin to shift thereby affecting the accuracy of the laser cuts at the downstream laser beams.

Therefore, it is desirable in the industry to have a laser processing apparatus with improved efficiency. More specifically, it is desirable to have a laser processing apparatus capable of handling materials that have internal stresses, with sufficient versatility to handle any laser processing task. Additionally, it is desirable to have a laser processing system capable of tightly controlling the position and flutter of the moving web at high speeds, despite an extremely thin, woven or non-homogenous (such that it contains internal stresses) material. Moreover, it is desirable to have a laser processing apparatus capable of minimizing the effects on the laser process of dimensional and compositional variability in the web. Finally, it is desirable to have a laser processing apparatus capable of performing cut-out shapes or patterns and/or cross-cuts on a moving web without tearing the web.

BRIEF SUMMARY OF THE INVENTION

The laser processing system has a beam source for directing a high energy beam onto a substrate surface in order to physically or chemically alter the substrate. A web-securing drum is positioned in the cutting area under the laser beam and in contact with the substrate. The web-securing drum applies a web-securing force on a variable area of the substrate material to secure the substrate during the processing step. A template can be placed over the web-securing drum as needed in order to alter or vary the web-securing force.

DETAILED DESCRIPTION

Figure 1:
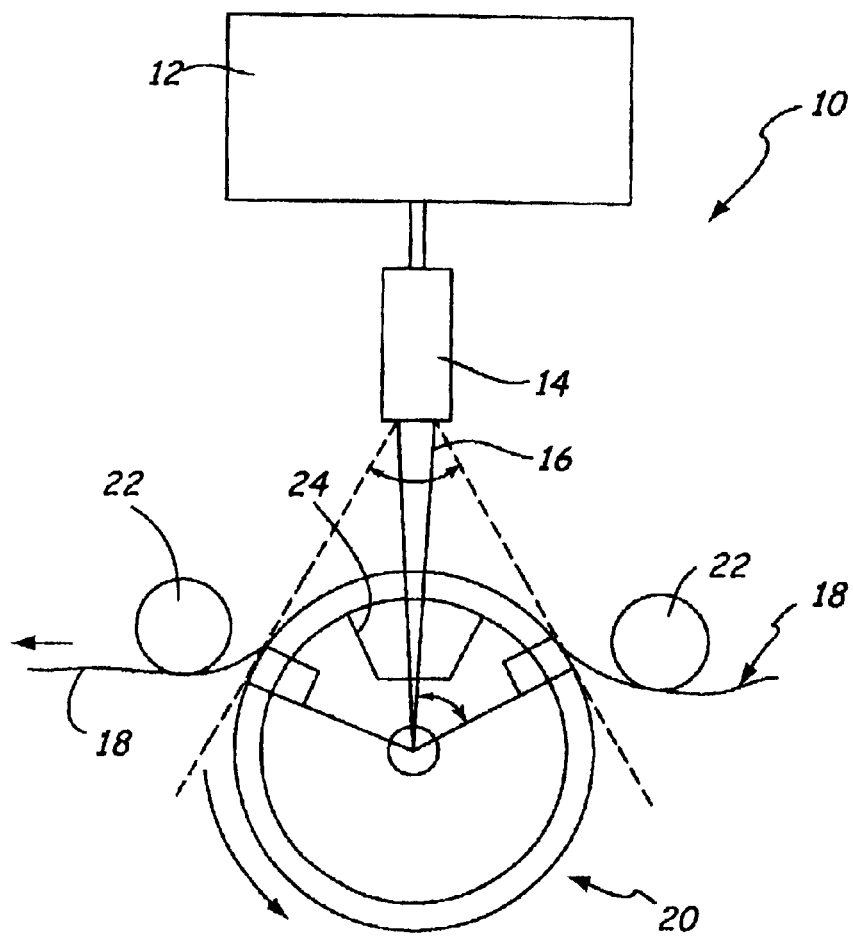
FIG. 1 is schematic block diagram of the system of the present invention.

As shown in FIG. 1, the web-securing system 10 of the present invention generally includes a laser system 12 (typically including at least a beam source and a computer controller) which controls heads 14 to direct a laser beam 16 onto a substrate material or web materials 18. As shown, the web 18 is fed over a web-securing drum 20 and under idle rollers 22. The web-securing drum 20 is a cylinder having a plurality of grooves for catching and retaining debris from the web 18, and a plurality of openings for introducing a negative pressure to the web 18. A vacuum shoe 24 positioned beneath the cutting area provides a vacuum or a negative pressure through the openings in the web-securing drum 20 to hold the web 18 against the web-securing drum 20 and to draw debris away from the web 18 during laser processing.

In the instant invention, the phrase "laser processing" refers to any number of laser operations, including sealing, scoring, cutting, marking, scribing, perforating, and other similar operations. Generally "laser processing" in the instant invention is used to describe laser processes that alter the chemical or physical properties of the substrate material, and not to describe laser processes used to apply coatings.

In the instant invention, the term "laser" refers to any type of laser, including but not limited to a CO2 Laser, a ND:YAG laser, or any other laser system. Additionally, the term "laser" as herein used includes e-beam or other high energy beams.

Generally, typical substrate materials 18 include, but are not limited to, plastic or polymeric materials such as polyethylene (PE), linear and low-density polyethylene (LLDPE and LDPE); high-density polyethylene, polyethyleneterephthalate (PET), and oriented polypropylene (OPP). Similar polymers such as, for example, metallocene doped polyethylene are also within the scope of the present inventive method. In addition to laminates containing the aforementioned compositions, the present inventive method can be used in single-layered substrate materials of uniform composition or multi-layered substrate materials of uniform or heterogeneous composition. The instant invention can also be used to process fabrics, non-woven materials, and green ceramics (unfired ceramics). Moreover, the present invention can be used to process multi-component or non-uniform compositions with different thermal expansion rates. The invention may be used with steels, paper, plastics, woven fabrics, and almost any other material susceptible to laser processing. Finally, in particular, the present invention applies to non-homogenous substrate materials that have internal stresses, which may be relieved during laser processing.

Generally, the instant invention employs a web-securing drum 20 to apply a force such as a vacuum, a differential pressure or an electro-static force to the underside of the web 18 (the side or surface of the web opposite the laser beam 16) to secure the web 18. Alternatively, depending on the molecular properties of the material to be processed, the substrate of the web 18 may be treated to alter the substrate at a molecular level to polarize the substrate permanently or temporarily to provide the securing force. The securing force secures the web 18 while the web 18 is directly under the laser beam 16 in order to prevent fluttering and undesired shifting during processing. Since the web 18 rests against a surface at a known distance, the focal point of the beam 16 can be adjusted during operation to an accuracy level that was typically not possible with tension-only securing mechanism is. Specifically, the web 16 is laser processed while in contact with a surface of the web-securing drum 20, and the laser beam 16 can be focused to vaporize the surface of the web 18 very accurately based on the relative position of the surface of the roller 20.

With some web materials 18, the material is so transparent and/or thin that the web material 18 absorbs only 15% or less of the beam. In order to alter the web 18, the laser beam 16 must be operated at a power level above the optimal power level such that not only does the beam 16 vaporize the top layer of the web 18, but the beam 16 also melts the lower layers of the web 18. If such a web 18 is held by tension only, the web 18 may tear or separate where it has been melted. By supporting the web material 18 with a web-securing drum 20, even if the web 18 is otherwise-tensioned, the web-securing force supplied by the web-securing drum 20 can be made sufficient to prevent the web material 18 from shifting. When the lower layers are melted if the web 18 is allowed to shift too much, the molten web material has insufficient tensile strength to hold the web 18 together.

By securing the web 18 to prevent it from shifting, even for a short period of time, the melted lower layers of the web 18 have sufficient time to cool and to solidify before the web 18 is permitted to shift, at which point the previously melted lower layers have solidified sufficiently to withstand the tension on the web 18. While the drum 20 may not be able to eliminate shifting of the web 18 entirely, by laser processing the web 18 on the roller 20, the web-securing force supplied by the roller 20 is sufficient to restrict or limit the movement of the web material 18, thereby limiting the effect of any tension in the web 18 and preventing tearing of the web 18. In this way, very thin web materials can be processed with a high energy beam without tearing the web 18.

Generally, providing a support for thin webs 18 is desirable; however, if the support surface is flat or does not move with the web 18, the support can scratch the web. Where the web is pre-printed with product logos or any type of lettering or design, such scratches are unacceptable because they damage the web label.

The web-securing drum 20 provides support and turns with the movement of the web 18 such that the web 18 is supported without concern for damaging the web surface. An actuator motor (not shown) rotates the web-securing drum 20, securing and advancing the web 18 through the cutting zone (under the laser beam 16). The actuator motor can be synchronized to the idler rollers 22 and to the web 18 itself, such that the roller 20 is turned at the appropriate time. Additionally, the actuator motor can turn or adjust a rotational position of the drum 20 to synchronize a pattern or the drum 20 with a pattern that is pre-printed on the web material 18 by releasing the web-securing force temporarily and reinstating the force as soon as the drum 20 is aligned with the pattern.

Since the web-securing drum 20 applies the force to the underside of the web 18, the web 18 can be secured directly within the cutting zone of the beam 16, without interfering with the beam 16. Thus, flutter and shifting of the web material 18 can be virtually eliminated. Moreover, since the web material 18 is held against a surface of the roller 20, the focal point of the beam 16 can be calculated to a level of precision previously unattainable with moving webs. Specifically, the focal point of the beam 16 can be calculated to strike the surface of the web 18 precisely, because the web 18 is secured to a known surface (e.g. the web-securing drum 20). Thus, not only can the present invention perform laser processing operations on very thin films, woven fabrics, non-homogenous substrates, and various other webs, but the beam 16 can be operated at an optimized power level according to the particular web material.

FIG. 1 illustrates an embodiment of the web-securing drum 20 for applying a vacuum or negative pressure to the web material 18. However, other types of web-securing forces are anticipated. The web-securing drum 20 can be a vacuum or negative pressure drum, an electro-static drum, or any other kind of drum that applies a web-securing force to the surface of the web material either directly under the beam 16 or in immediate proximity of the beam. In each case, the design of the drum 20 remains essentially the same, though in some instances minor adaptations may be required. For instance, in the case of an electro-static force, the same drum 20 may be used, but thy drum 20 may need to be electrically grounded relative to the web 18.

In the case of electro-static force, the web 18 can be electrostatically charged so as to create an attractive force between the electrostatically charged web 18 and a web-securing drum 20 that is grounded relative to the charged web 18. In such an embodiment, since the web-securing force is applied by electrostatic charge, openings in the roller 20 are not required to supply the force. However, a vacuum may still be desirable to remove debris from the web 18 during processing, and a combination of a vacuum and electrostatic force may be used. Finally, where a smooth surface of the roller is desirable, a template can be placed over the surface of the roller in order to configure the roller 20 according to a specific need. Thus, the roller 20 may be covered by a smooth template, a patterned template, or no template as required by the specific high energy beam process.

In the present invention, the web 18 undergoes laser processing while positioned on a curved surface. The curved profile of the roller 20 makes the cutting of shapes and individual pieces, as well as the cutting of strips, faster and easier. Specifically, because the curvature of the roller 20 is known, as is the surface location of the web 18, the beam 16 can be focused precisely to laser process a shape or almost any pattern on the web 18 even as the angle of the web 18 changes as it advances along the circumferential profile of the roller 20. The web-securing drum 20 makes facilitates the laser process patterns on the moving web 18 using steered beam systems, motion systems such as an x-y Cartesian flying optic system with dynamic Z for focusing, or other similar motion laser systems.

Using a steered beam system, such as a galvo, to direct and move the beam 16 during laser processing directly on the web-securing drum 20, the focal point of the beam 16 can be maintained throughout the field area of the beam 16. The web-securing drum 20 allows the laser to shape cut very well. To shape cut on the curved surface of the roller 20, the laser system must adjust the focal point of the beam 16 so that it follows the roller's surface. With the steered beam 16, the system 10 adjusts the focal point of the beam 16 to follow the surface of the roller 20, which allows the laser process to perform on this material without fracturing. Moreover, with the present invention, one may laser process the web 18 with an accuracy equal to or better than the accuracy of laser processing on a stationary web, because the precise position of the surface of the web 18 has a higher degree of precision.

The diameter of the web-securing drum 20 may vary according to the specific application. Generally, the web speed, the size of the object to be cut, the field size (for example in a galvo system), and the diameter of the drum 20 must all be considered. In one embodiment, a field size of 11 inches was used to cut patterns on a moving web over a drum 20 using vacuum web-securing force and having an 80 centimeter diameter. Other drum sizes and field sizes are anticipated. However, the speed of the steered beam system and the curvature of the drum 20 relative to the speed of the web 18 imposes a limit on the field size because the beam 16 cannot alter the web 18 if the beam 16 meets the surface of the web at an angle that is tangential to the surface of the web 18. Thus, the diameter of the drum 20 imposes a limitation on the treatable surface of the web 18 in the direction of the web movement as shown by the dotted lines in FIG. 1.

Figure 2:
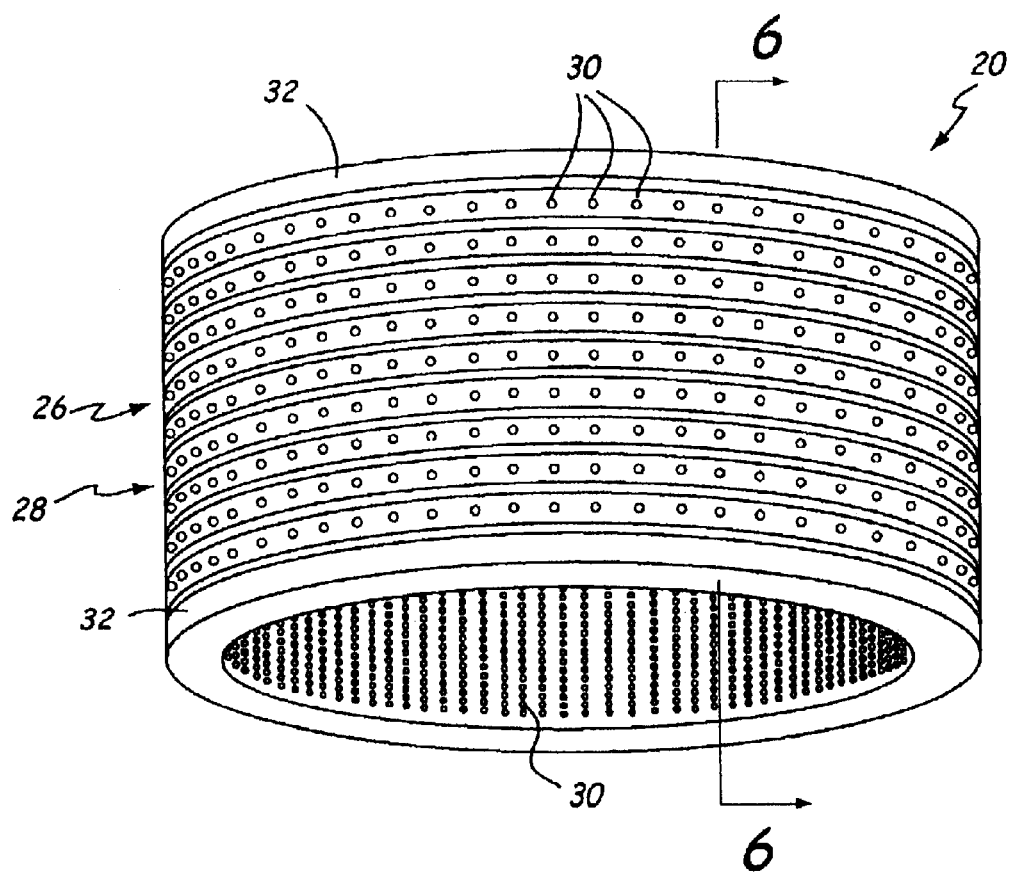
FIG. 2 is a top plan view of an embodiment of the web-securing drum of the present invention.

As shown in FIG. 2, the web-securing drum 20 is a cylinder comprised of a plurality of rings 26 separated by grooves 28. The rings 26 and grooves 28 each define a plurality of openings 30 along their respective circumferences. The openings 30 extend entirely through the cylinder. Finally, edge rings 32 border both sides of the cylinder. In the embodiment shown, the edge rings 32 generally have no openings.

The web-securing drum 20 is generally cylindrical. To apply the negative pressure to the underside of the web 18 when in operation, a vacuum shoe 24 is positioned inside the web-securing drum 20 cylinder. The negative pressure reaches the underside of the web 18 through the openings 30.

During laser processing, typically smoke and debris form at or near the surface of the web 18. The grooves 28 draw debris away from the surface of the web 18. The negative pressure in addition to securing the web 18, may sometimes assist in drawing away the debris. As shown, all of the grooves 28 have the same depth. However, it is contemplated that particular laser processing operations may generate greater amounts of debris, and varying depths of the grooves 28 may be desirable in certain circumstances in order to capture larger debris particles.

The embodiment shown in FIG. 2 is specifically suited to cutting strips from a web 18. Generally, heads 14 direct one or more laser beams 16 onto the web 18 directly above one or more of the grooves 28. The openings 30 disposed on the rings 26 hold the web 18 before, during and after the laser processing operation, preventing shifting of the web 18, and preventing fluttering and flapping of the web 18. This allows for the laser beam 16 to be optimized in terms of both focal point and power usage, so as to operate at or near peak efficiency at all times.

The web-securing drum 20 of FIG. 2 is formed of a plurality of stainless steel rings or loops, separately manufactured and bolted together to form the cylinder. As shown in cross-section in FIG. 7, the rings 26, grooves 28 and edge rings 32 are separate elements having different exterior radii and the same interior radii. When bolted together, the exterior surface has rings 26 and grooves 28 at different external radii, while the interior surface is smooth, appearing to be virtually seamless.

Figure 3:
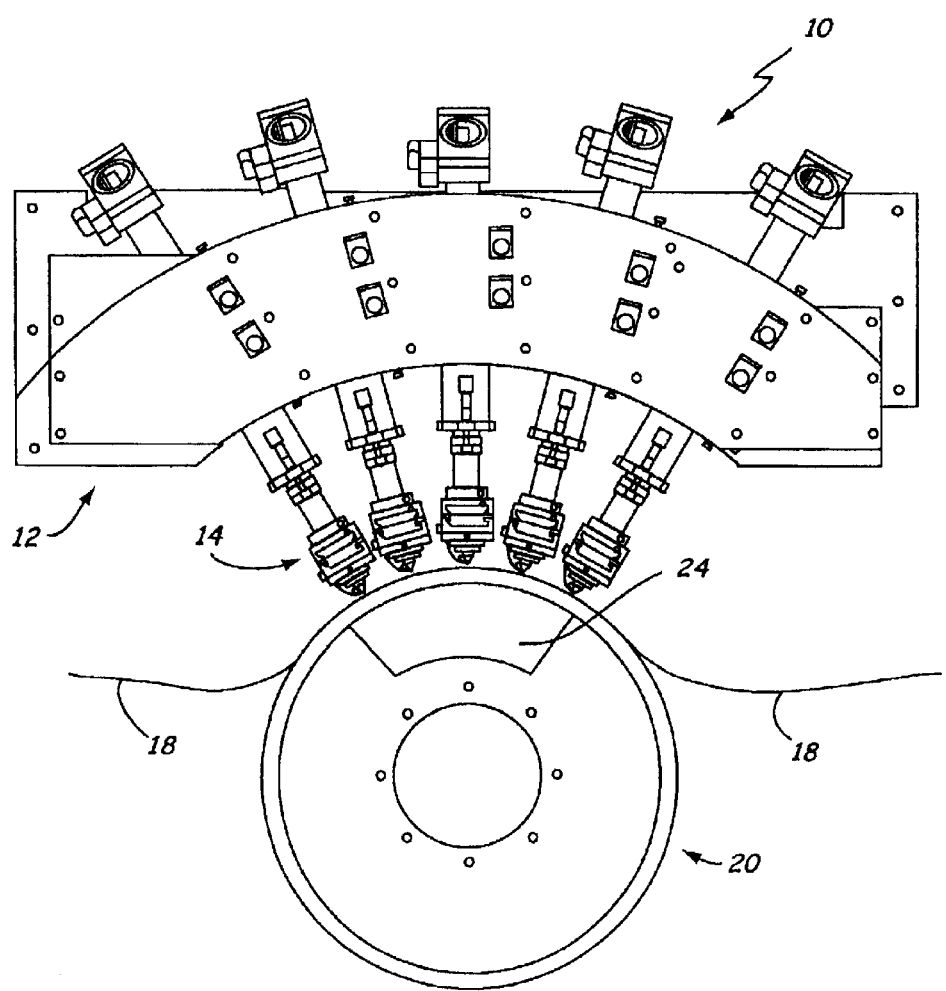
FIG. 3 is a side plan view of the web-securing drum in an embodiment of the laser system of the present invention.
Figure 4:
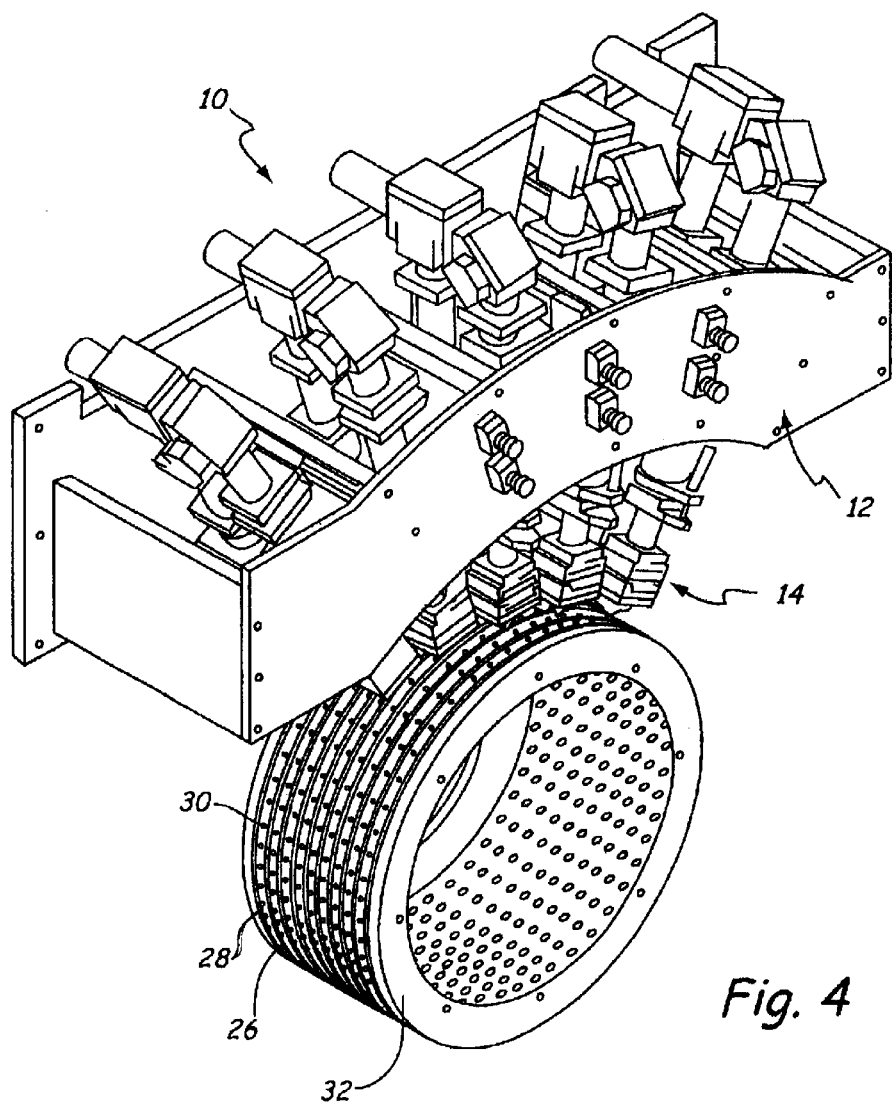
FIG. 4 is a top plan view of the web-securing drum of the present invention.

FIGS. 3 and 4 illustrate an embodiment of the invention using a plurality of heads 14 of a laser system 12 to cut strips from a moving web or web 18. The head 14 occupies a certain amount of physical space. The amount of space occupied by the head 14 determines how closely two heads 14 can be positioned relative to one another. In this embodiment, the system shown is a fixed beam system.

In the prior art, to cut strips from a web 18 that had internal stresses, the heads 14 had to be in line transverse to the web 18, such that all the laser beams 16 cut the web 18 at the same line normal to the direction of movement of the substrate material. Otherwise, as one laser beam 16 began its cut, it would release internal stresses in the web 18, causing the material 18 to shift. This shift would make any down stream laser operations less accurate.

As illustrated, using the web-securing drum 20 of the present invention, the heads 14 can be staggered to cut the web 18 into narrower strips than were possible in the prior art. Though the spacing limitations of the heads 14 remain the same, the web-securing drum 20 allows the heads to be staggered to cut at different points along the axis of the moving web, such that the adjacent web materials may be cut or processed at different times. In essence, as illustrated in FIG. 4, the heads 14 can overlap to cut extremely narrow strips.

The web-securing drum 20 presents a number of advantages. First, the web-securing drum 20 controls the advance of the web 18 through the cutting zone under the laser beam 18, limiting flap and flutter of the moving web 18 directly in the cutting zone. Second, the web-securing drum 20 holds the web 18 allowing the for processing of the moving web 18 without tensioning the web 18 in the cutting zone, allowing for processing of woven fabrics and other substrate materials 18 with uneven or non-homogenous composition. Third, since the web-securing drum 20 tightly controls the flutter and flap of the web 18 while under the laser beam 16, the system 10 processes web materials 18 with a precise focal point and optimal power usage. Fourth, since the web-securing drum 20 controls the movement of the web 18 in the cutting zone (eliminating shifting and inaccuracy as concern), laser operations 12 can be performed at peak efficiency even at high speeds. Fifth, when cutting out individual parts or pieces from a web 18, the web-securing drum 20 prevents the cut-out parts from falling out of the moving web 18 in the cutting zone. Sixth, the web-securing drum 20 allows for use of the entire width of the web 18, because material need not be reserved for belts or tractor feeding of the web 18. Finally, flimsy, non-uniform and very thin materials can be laser processed with the same or better accuracy than prior art systems.

Figure 5:
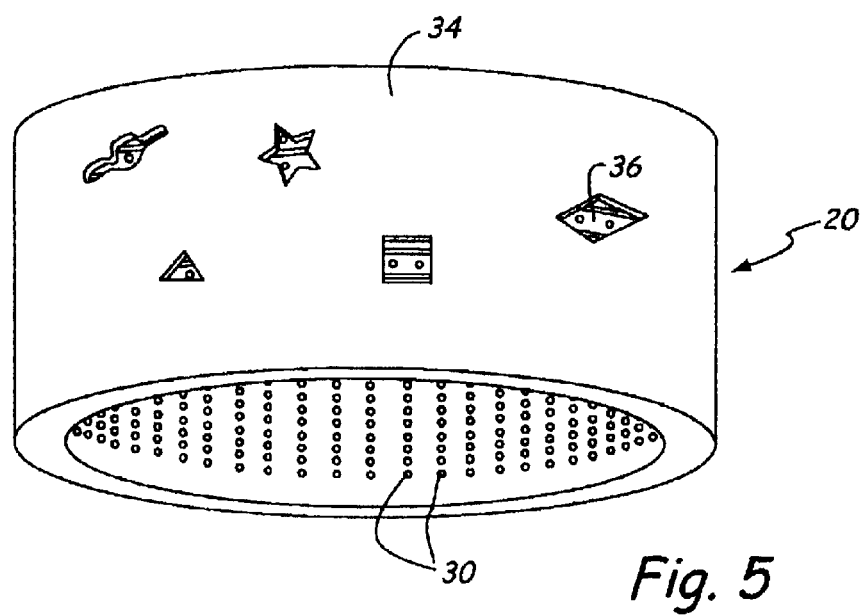
FIG. 5 is a top plan view of a template placed over the web-securing drum of the present invention.

FIG. 5 illustrates a template 34 overlaying the web-securing drum 20 to take advantage of the properties of the web-securing drum 18, while providing support for particular shaped patterns 36. This template can be formed from plastic or rubber and can be substituted or inserted over the web-securing drum 20 as needed and with minimal down-time. While the template 34 is shown with several patterns, a worker skilled in the art will recognize that various templates could be made to provide for any laser process pattern to achieve a particular cutout.

When using the cut-out, it may be necessary to synchronize or index the moving web 18 to the patterns, particularly when performing laser processes on a pre-printed web 18. In such cases, the negative pressure may be switched on and off in order to adjust the position of the template 34 or the rotational position of the web-securing drum 20 to align the patterns. This synchronization can be performed automatically as taught by U.S. patent application Ser. No. 10/233, 754, filed Sep. 3, 2002, entitled, "SYSTEM AND METHOD FOR SYNCHRONIZING A LASER BEAM TO A MOVING WEB", which is incorporated herein by reference.

Figure 6:
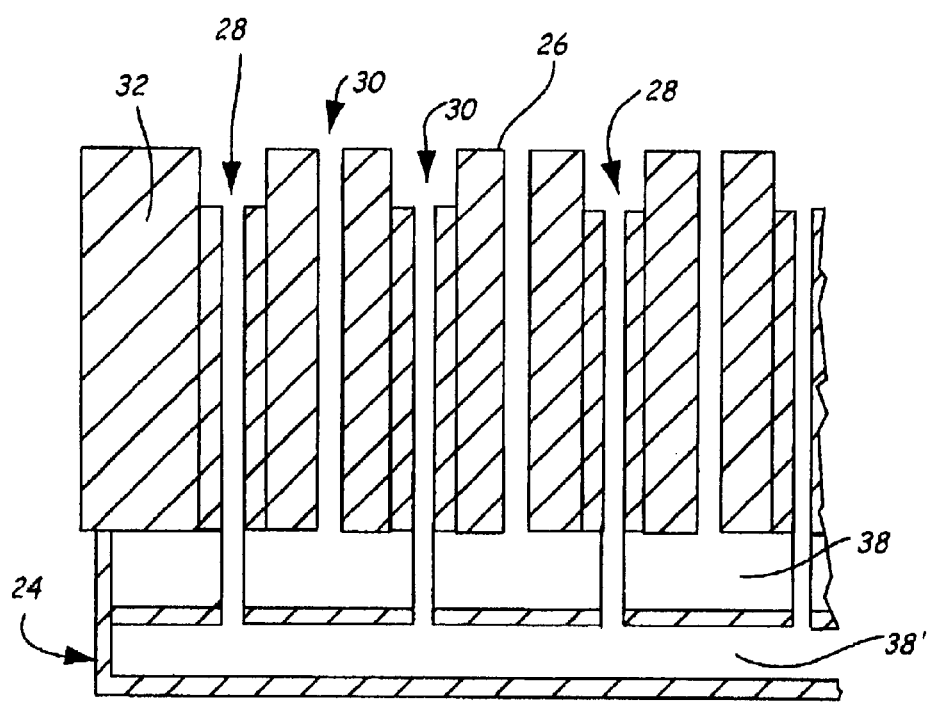
FIG. 6 is a cross-sectional view of a portion of an embodiment of the web-securing drum taken along line 6–6' in FIG. 2.

As illustrated in FIG. 6, the grooves 28 have an outer diameter less than the outer diameter of the rings 26. In the embodiment illustrated, both the grooves 28 and the rings 26 define openings that communicate a differential pressure from the vacuum shoe 24 to a surface of the web 18 in contact with the web-securing drum 20.

Generally, the vacuum shoe 24 may be divided into one or more chambers 38 having different levels of negative pressure. In the embodiment illustrated in FIG. 6, the vacuum shoe 24 is divided into two chambers 38 and 38'. In this embodiment, chambers 38,38' have different levels of negative pressure. Specifically, chamber 38' has a greater negative pressure than chamber 38, such that the grooves 28 deliver more vacuum to the web 18 in order to draw larger particles of debris away from the web 18. Alternatively, when greater control of the substrate material is required, chamber 38 may be supplied with greater negative pressure so as to exert more vacuum force on the web 18 during processing. The level of vacuum in the chambers 38,38' of the vacuum shoe may be adjusted as required by the specific laser process and by the particular web 18.

In general, the vacuum shoe 24 must extend sufficiently to deliver negative pressure to the substrate material that is being processed by the laser system 12. Specifically, referring to FIG. 1, the laser beam 16 may be directed by the laser system 12 to move the focal point of the beam 16 along the surface of the web 18 as the substrate material is being advanced by the web-securing drum. The laser beam 16 operates at its greatest efficiency when the beam 16 is normal to the web 18. However, the power of the beam 16 may be modulated by the system 12 as needed to alter the web 18 at other angles along the profile of the web-securing drum 20. The limit at which the laser beam 16 may function effectively in this system is determined by the tangent line from the head 14 to the surface of the cylindrical web-securing drum 20 as shown by the dotted lines in FIG. 1. In FIG. 1, the vacuum shoe 24 is shown to be less than the greatest possible range at which the laser beam 16 can be utilized; however, the width of the vacuum shoe 24 can be modified to accommodate wider angles.

Additionally, in alternative embodiments, it may be desirable to use the web-securing drum 20 to cause separation between the web 18 and the laser processed patterns 36 on the web 18. This could be accomplished, for example, by releasing the negative pressure of the web-securing drum 20 on the web 18, except where the patterns 36 exist, such that as the web-securing drum 20 continues to turn, the substrate 18 separates from the roller 20 while the pattern cut-outs remain fixed to the web-securing drum 20 on the template 34 by the negative pressure.

Figure 7:
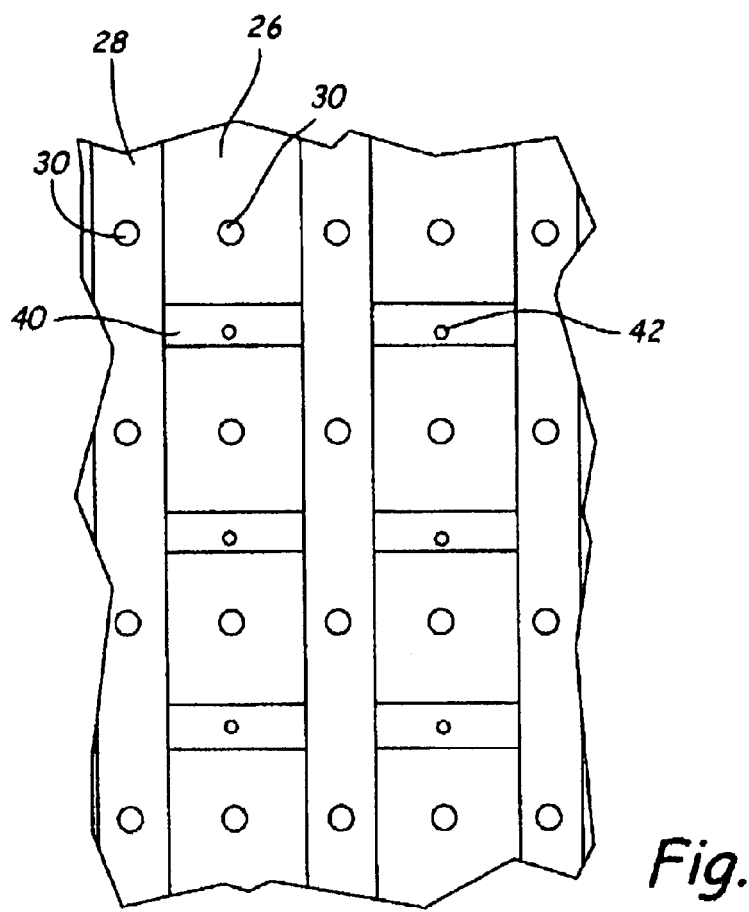
FIG. 7 is an alternative embodiment of the surface of the web-securing drum of the instant invention.

FIG. 7 illustrates an alternative embodiment, which provides a cross-groove 40 having an air opening 42 for cycling air through the cutting area and into the groove 28 to assist in removing and capturing debris from the web 18. Specifically, air may be pulsed or blown through the air opening 42 at the same time as a vacuum is applied through openings 30, such that the air cycles from the air opening 42, along the cross-groove 40 and into the groove 28.

Figure 8:
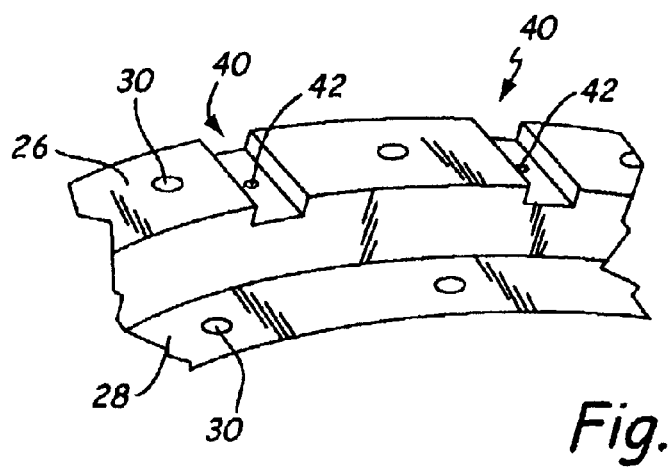
FIG. 8 is a side view of the alternative embodiment of FIG. 8.

As illustrated in profile in FIG. 8, the cross-groove 40 is shallower than the groove 28, thereby allowing for small puffs of air to assist debris to flow into the groove 28.

While FIGS 1-8 illustrate a web-securing drum 20 that uses a negative pressure to secure the web 18 against the roller 20. Alternatively, the system 10 can employ electrostatic force to releasably adhere the web 18 to the roller 20 during laser processing, using the same roller 20 or roller 20 with a template 34, which can have patterns as shown illustrated in FIG. 5 or which can be smooth.

Figure 9:
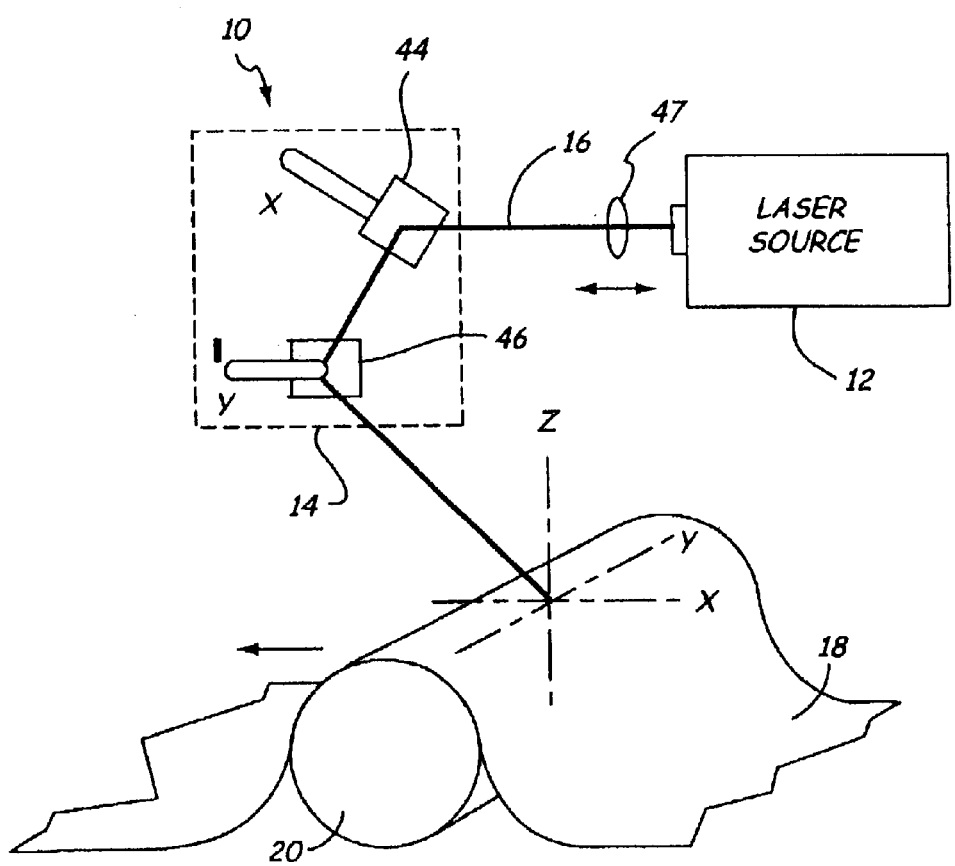
FIG. 9 is a schematic diagram of a steered beam system according to the present invention.

FIG. 9 illustrates a web securing system 10 according to the present invention using a steered beam. As shown, the laser source 12 generates a beam 16 that is directed by x and y mirrors 44,46 and focused by the z-translator 47 onto the web 18, which is secured by the web-securing drum 20. The z-translator 47 has a moving lens that moves along the axis of the beam 16. The x and y directions are shown in the plane of the web material. However, the curvature of the drum 20 introduces a z-height to the focal point of the laser beam 16. As the beam 16 performs a laser process on the web 18, the z-height or focal elevation of the beam 16 is adjusted by the z-translator 47 according to the pattern and speed of the moving web 18 to perform lager processes on the web 18, which conforms to the curved surface of the web-securing drum 20.

As shown in FIG. 7, with a vacuum drum 20, it is possible to apply such hold down force selectively to the web 18. Alternatively, using an electrostatic drum 20, it is possible to separately ground and charge areas of the drum by electrically isolating the sections, such as with sections of a pie, to selectively attract and/or repel the web material 18 as needed. Alternatively, the web-securing drum 20 can be formed with sections removed or collapsed to form an incomplete or irregular cylinder.

Although the present invention has been described with reference to preferred embodiments, workers skilled in the art will recognize that changes may be made in form and detail without departing from the spirit and scope of the invention.

What is claimed is:

1. A laser system comprising:
   one or more high energy beams;
   a moving web extending under the one or more high energy beams; and
   a web-securing drum disposed beneath the one or more high energy beams and in contact with a portion of the moving web, the web-securing drum having a substantially cylindrical shape, the web-securing drum for applying a securing force on the portion of the moving web directly under the one or more high energy beams to releasably secure the portion to the drum during a laser processing operation.

2. The laser system of claim 1 wherein the securing force is a negative pressure, and wherein the web-securing drum comprises:
   a cylinder;
   a plurality of openings disposed on a surface of the cylinder and extending through the cylinder; and
   a vacuum shoe for providing at least one negative pressure to the substrate material through the openings in the cylinder.

3. The laser system of claim 1 wherein the securing force is an electrostatic force, and wherein the moving web is electrostatically charged and the web-securing drum comprises:
   a cylinder that is electrically grounded.

4. The system of claim 1 and further comprising:
   a template for defining patterns for laser processing and for covering the web-securing drum during operation.

5. The system of claim 1 wherein the one or more high energy beams physically alter at least a surface of the portion of the moving web while the portion is in contact with the web-securing drum.

6. The system of claim 1 wherein the moving web is selected from a group consisting of a woven fabric, a non-woven fabric, a plastic film, a metal film, a paper, a metallized film, and a green ceramic.

7. The system of claim 1 wherein the one or more high energy beams alter the portion of the moving web while the portion of the moving web is on a curved surface of the web-securing drum.

8. The system of claim 2 wherein the vacuum shoe is divided into one or more chambers, each chamber having a different negative pressure, and wherein the vacuum shoe delivers the different negative pressure from each chamber to at least one opening on the web-securing drum.

9. The system of claim 1 wherein the securing force is applied selectively.

10. A method of processing a pattern on a moving web comprising:
    positioning the moving web over a cylindrical drum positioned under a focused beam of a high energy beam system;
    applying a web-securing force on a bottom surface of the moving web opposite to the focused beam and in contact with the cylindrical drum;
    advancing the moving web in a web direction; and
    directing the focused beam onto a top surface of the moving web as the web is advanced.

11. The method of claim 10 further comprising:
    steering the focused beam over the top surface to trace a pattern.

12. The method of claim 10 wherein the focused beam is an electron beam.

13. The method of claim 10 wherein the focused beam physically alters the moving web according to a pattern along a curved surface directly opposite the bottom surface of the moving web in contact with the cylindrical drum.

14. The method of claim 13 further comprising:
    adjusting a focal point of the focused beam along the curved surface.

15. The method of claim 10 wherein the step of applying a web-securing force comprises:
    electrostatically charging the moving web; and
    grounding the cylindrical drum relative to the moving web.

16. The method of claim 10, prior to positioning the moving web, the method further comprising:
    placing a template over the cylindrical drum.

17. The method of claim 10 further comprising:
    synchronizing a rotational position of the cylindrical drum with a printed pattern on the moving web.

18. A system for high energy beam processing of non-homogenous substrate materials comprising:
    a beam source emitting a beam having sufficient energy to cut or score and having a control system and one or more heads for focusing the beam onto a substrate in a cut zone to process a pattern on the substrate;
    a cylinder positioned in the cut zone, the cylinder capable of controlled rotation, the cylinder being in contact with the substrate; and
    a web-securing force applied to the substrate in conjunction with the cylinder to secure the substrate in the cut zone.

19. The system of claim 18 wherein the web-securing force is selected from a group consisting of a negative pressure, an electrostatic force, a differential pressure, and a magnetic force.

20. The system of claim 18 wherein the web-securing force is a negative pressure and wherein the cylinder comprises:
    a plurality of openings disposed on a surface of the cylinder and extending through the cylinder; and
    a vacuum shoe for providing at least one negative pressure to the lower surface of the substrate through the openings in the cylinder.

21. The system of claim 18 wherein the web-securing force is an electrostatic force and wherein the substrate is electrostatically charged relative to the cylinder.

22. The system of claim 20, wherein the vacuum shoe is disposed inside the cylinder beneath the cut zone for providing the negative pressure to the substrate through the openings.

23. The system of claim 20, wherein the vacuum shoe is partitioned into chambers having different levels of negative pressure, and wherein the vacuum shoe is capable of delivering the different levels of negative pressure to the surface of the substrate.

24. The system of claim 18, wherein the cylinder further comprises:
    concentric rings attached to one another to form a cylinder, each ring having an exterior radius and an interior radius, wherein the interior radius of each of the concentric rings is the same.

25. The system of claim 24, wherein an external surface of the cylinder is formed from concentric rings that vary between two radii.

26. The system of claim 25, wherein concentric rings of a smaller radii form grooves in the external surface of the cylinder for capturing debris.

27. A method for scoring patterns on a non-homogenous moving web comprising:
    positioning a moving web over a web-securing cylinder within a cut zone of a laser system;
    applying selectively a web-securing force to a portion of the moving web in contact with the web-securing cylinder;
    rotating the web-securing cylinder as the moving web is advanced through the cut zone; and
    tracing a pattern on the portion of the moving web with the at least one laser beam.

28. The method of claim 27 further comprising:
    synchronizing a rotational position of the web-securing cylinder; and
    adjusting the rotational position of the web-securing cylinder to synchronize a template pattern placed over the web-securing cylinder with a corresponding printed pattern on the moving web.

29. The method of claim 27 wherein before positioning the moving web, the method further comprises:
    positioning a template over the web-securing cylinder.

30. The method of claim 29 wherein the template has one or more trace patterns disposed on an outer surface.

31. The method of claim 27, further comprising:
    adjusting a focal point of the laser beam according to a curvature of the moving web within the cut zone.

32. A web-securing drum positioned with a cutting zone of a focused beam of a high energy beam system, the web-securing drum having a plurality of grooves extending around a circumference of the web-securing drum and openings on an outside surface and spaced around the entire circumference of the web-securing drum, and a vacuum shoe disposed within the web-securing drum for supplying a negative pressure to the surface of the moving web through the openings, the web-securing drum supplying a force to a surface of a moving web and securing the moving web within the cutting zone.

33. The web-securing drum of claim 32, wherein the openings extend from the outside surface to an interior surface of the web-securing drum for removing debris from the moving web.

34. The web-securing drum of claim 32 wherein the web-securing drum is electrically grounded and the moving web is electrostatically charged.

35. The web-securing drum of claim 34 wherein the high energy beam processes a pattern on the web material while the web material is precisely controlled in a direction of movement of the moving web.

36. The web-securing drum of claim 32 wherein the force is an electrostatic force.

37. The web-securing drum of claim 32 further comprising:
    a controller for selectively applying the force to the surface of the moving web.

38. The web-securing drum of claim 32 wherein the force is a differential force.

39. The web-securing drum of claim 32 further comprising:
    transverse grooves extending along a surface of the web-securing drum and extending transverse to the grooves along the circumference of the web-securing drum, each transverse groove having one or more fluid openings for directing bursts of fluid through the transverse groove and into the grooves to assist in carrying away debris from the cut zone.

40. A web-securing drum positioned with a cutting zone of a focused beam of a high energy beam system, the web-securing drum having a plurality of grooves extending around a circumference of the web-securing drum and openings on an outside surface and spaced around the entire circumference of the web-securing drum, and transverse grooves extending alone a surface of the web-securing drum and extending transverse to the grooves along the circumference of the web-securing drum, each transverse groove having one or more fluid openings for directing bursts of fluid through the transverse groove and into the grooves to assist in carrying away debris from the cut zone, the web-securing drum supplying a force to a surface of a moving web and securing the moving web within the cutting zone.

41. The web-securing drum of claim 40, wherein the openings extend from the outside surface to an interior surface of the web-securing drum for removing debris from the moving web.

42. The web-securing drum of claim 40 wherein the web-securing drum is electrically grounded and the moving web is electrostatically charged.

43. The web-securing drum of claim 42 wherein the high energy beam processes a pattern on the web material while the web material is precisely controlled in a direction of movement of the moving web.

44. The web-securing drum of claim 40 wherein the force is an electrostatic force.

45. The web-securing drum of claim 40 further comprising:
    a controlled for selectively applying the force to the surface of the moving web.

46. The web-securing drum of claim 40 wherein the force is a differential force.

* * * * *

UNITED STATES PATENT AND TRADEMARK OFFICE
CERTIFICATE OF CORRECTION

PATENT NO. : 6,794,604 B2
DATED : September 21, 2004
INVENTOR(S) : Herke et al.

It is certified that error appears in the above-identified patent and that said Letters Patent is hereby corrected as shown below:

<u>Title page,</u>
Item [56], References Cited, U.S. PATENT DOCUMENTS, delete
"5,234,465 A      8/1993         Hahnke et al        264/138" and insert
-- 5,324,465      6/1994         Duffy et al.        264/138 --.

<u>Column 13,</u>
Line 22, "alone" should be -- along --.

<u>Column 14,</u>
Line 20, "controlled" should be -- controller --.

Signed and Sealed this

Eleventh Day of April, 2006

JON W. DUDAS
*Director of the United States Patent and Trademark Office*